United States Patent [19]

Skover, Jr.

[11] 4,200,031
[45] Apr. 29, 1980

[54] LOCKING CYLINDERS

[75] Inventor: Nick Skover, Jr., Racine, Wis.

[73] Assignee: Applied Power Inc., Milwaukee, Wis.

[21] Appl. No.: 882,550

[22] Filed: Mar. 2, 1978

[51] Int. Cl.² ...................... F15B 11/08; F15B 13/042
[52] U.S. Cl. .................................... 91/420; 180/89.15
[58] Field of Search ......................... 91/420; 180/89.15

[56] References Cited

U.S. PATENT DOCUMENTS

| | | | |
|---|---|---|---|
| 2,653,626 | 9/1953 | Finlayson | 91/420 X |
| 2,869,327 | 1/1959 | Symmank | |
| 3,411,521 | 11/1968 | Johnson | 91/420 X |
| 3,523,490 | 8/1970 | Bianchetta | 91/420 |
| 3,665,810 | 5/1972 | Parrett | 91/420 |
| 3,748,968 | 7/1973 | Pinto | 91/420 |
| 3,801,151 | 4/1974 | Reynolds | 91/420 X |
| 3,975,987 | 8/1976 | Panis | 91/420 |

FOREIGN PATENT DOCUMENTS

| | | |
|---|---|---|
| 2114824 | 10/1972 | Fed. Rep. of Germany . |
| 2363828 | 6/1975 | Fed. Rep. of Germany ............. 91/420 |
| 2551166 | 6/1976 | Fed. Rep. of Germany . |
| 2726165 | 12/1977 | Fed. Rep. of Germany . |

*Primary Examiner*—Irwin C. Cohen
*Attorney, Agent, or Firm*—John J. Byrne

[57] ABSTRACT

Disclosed are two embodiments of a locking cylinder. In both embodiments the locking cylinder comprises a housing, a working piston, a pilot piston, and a counter balance valve to substantially smoothen the operation of the working piston, particularly when an induced pressure is applied to the working piston. In the first embodiment, the pilot piston slides as a unit, although it may be formed in two axially separate parts. In the second embodiment, the pilot piston is formed in two axially separate parts, communicating bores are formed in the two parts, a ball valve is located in the bore in one of the parts, a free floating pin is disposed in the bores between the ball valve and an abutment surface in the other part, and the ball valve is biased shut. The pin is sized to unseat the ball valve when the two parts are in contact, but the two parts are biased apart by the action of the biasing means, which is transmitted through the pin to the abutment surface.

14 Claims, 8 Drawing Figures

LOCKING CYLINDERS

FIELD OF THE INVENTION

This invention pertains to locking cylinders. It is particularly, though not exclusively, adapted to power pivotably mounted loads back and forth over a point of unstable equilibrium. Still more particularly, it has been developed in the context of tilt system cylinders for tilt cab trucks, and it is disclosed in that context.

BACKGROUND OF THE INVENTION

When tilting cabs are forced over center by their tilt cylinders, a large induced pressure is suddenly applied to the working pistons in the cylinders, and the cylinders (and hence the cabs carried thereby) tend to bounce. Various counterbalance systems to obviate or minimize this bounce are, of course, known in the art. All such systems are, however, somewhat complex and therefore expensive to manufacture and liable to malfunctioning.

OBJECTS OF THE INVENTION

With the foregoing in mind, it is a principal object of this invention to provide a locking cylinder counterbalance system which is simple to manufacture, sturdy, and extremely reliable in use.

Other objects and advantages of the present invention will become apparent from the following detailed description of two preferred embodiments thereof taken in conjunction with the accompanying drawings.

DETAILED DESCRIPTION OF THE PRESENTLY PREFERRED EMBODIMENTS

Figure 1:
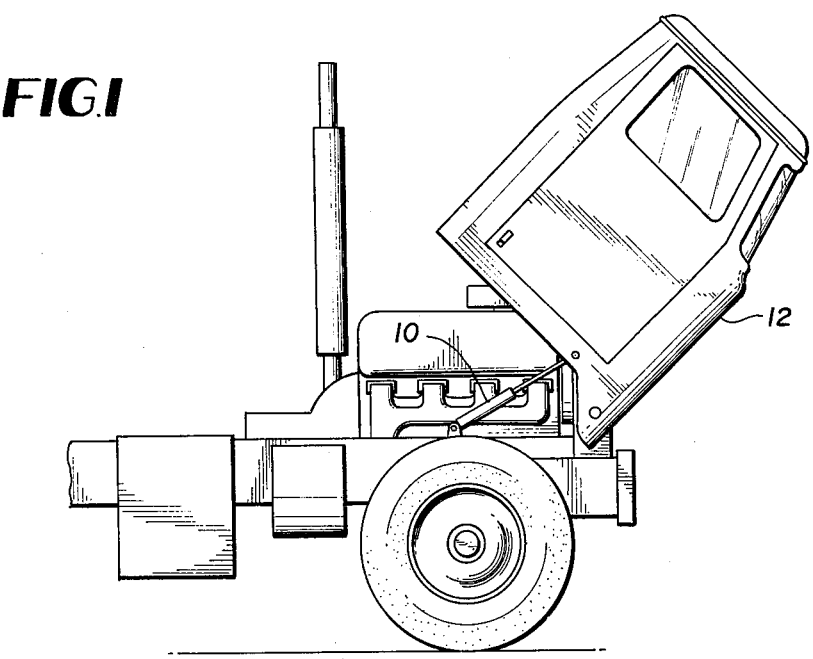
FIG. 1 is a side view of a tilt-cab truck employing a locking cylinder in accordance with this invention.
Figure 4:
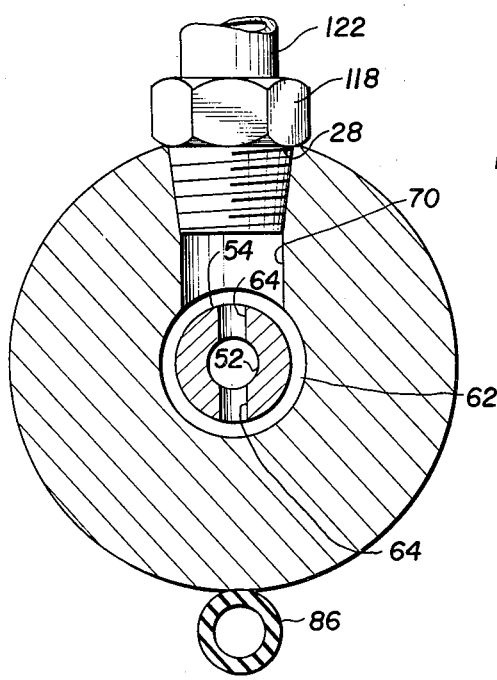
FIG. 4 is a view along the line 4—4 in FIG. 2.
Figure 5:
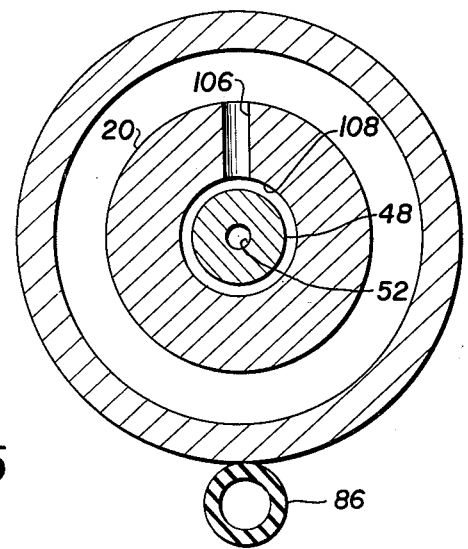
FIG. 5 is a view along the line 5—5 in FIG. 2.
Figure 2:
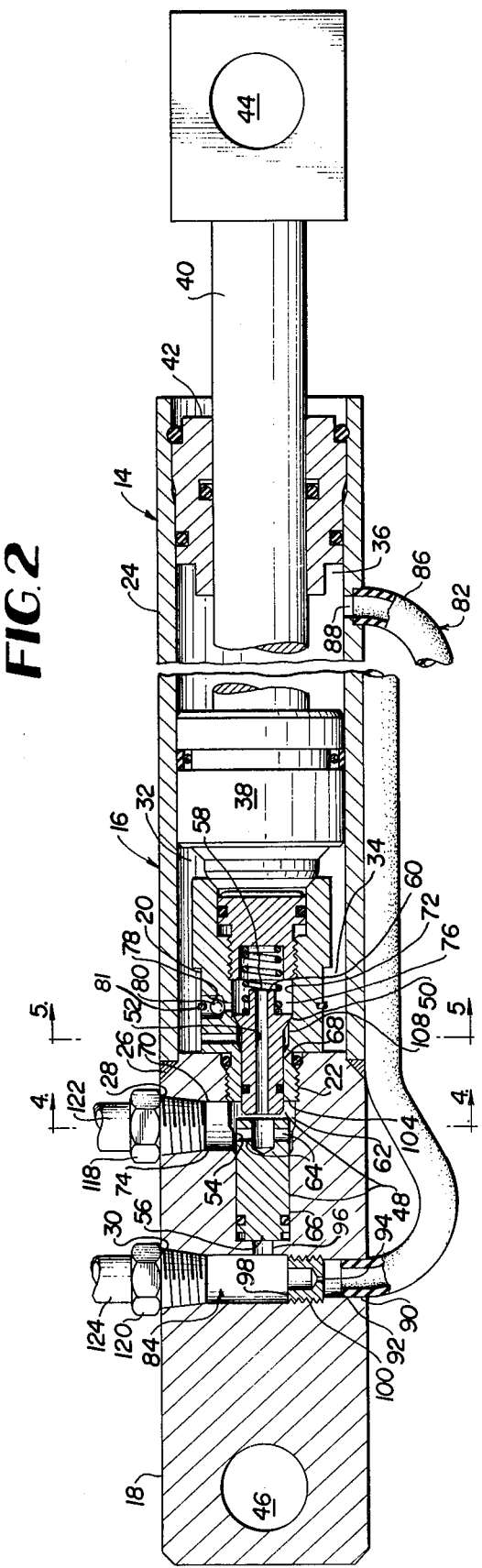
FIG. 2 is a cross-sectional view of a first embodiment of this invention showing the working rod in the retracted position.
Figure 3:
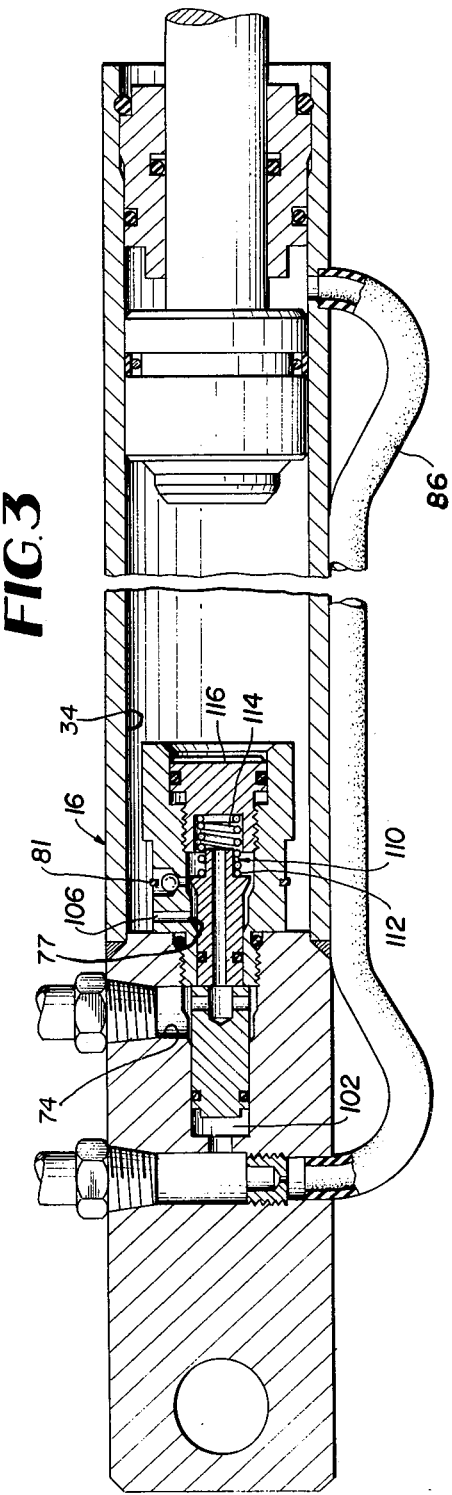
FIG. 3 is a cross-sectional view similar to FIG. 2 except that the working rod is shown in the extended position.

FIG. 1 illustrates the environment for which this invention was specifically designed. In this environment, a pair of locking cylinders 10 are used to power a pivotably mounted truck cab 12 back and forth over a point of unstable equilibrium. However, it will be appreciated that the locking cylinder 10 could be used to power any pivotably mounted load back and forth over a point of unstable equilibrium—and, indeed, for many other purposes as well.

STRUCTURE OF THE FIRST EMBODIMENT

A first embodiment of the subject invention is shown in FIGS. 2-5. In this embodiment the locking cylinder 14 comprises a housing 16 which for ease of fabrication is preferably formed in two separate parts, a control section 18 and a rod section 24 peripherally welded to the control section 18 at 26. A pilot piston housing 20 is threadedly received in the control section 18 at 22. The housing 16 contains a push port 28, a pull port 30, and an axial chamber 32 which is divided into an expansion chamber 34 and a rod chamber 36 by a working piston 38 slideably received in the housing 16 such that one surface of the working piston 38 faces the expansion chamber 34 and the other surface faces the rod chamber 36.

The working piston 38 carries a rod 40 which protrudes from the housing 16 through suitable packing 42, and the locking cylinder 14 can be mounted between two axles by a hole 44 in the rod and a hole 46 in the housing 16.

A pilot piston 48 is also slidably received in the housing 16. The pilot piston 48 carries, and is preferably formed integrally with, a poppet valving means 50, and it contains a bore 52 which communicates with the exterior of the pilot piston 48 at a first orifice 54 intermediate a first face 56 of the pilot piston 48 and the poppet valving means 50 and at a second orifice 58 on the other side of the poppet valving means 50. As shown, the bore 52 is preferably axial, the orifice 58 is preferably in the center of the second face 60 of the pilot piston 48, and the orifice 54 is preferably one of two diametrically opposed peripheral orifices which communicate with an annular chamber 62 via two radial bores 64. The pilot piston 48 may, as shown, be formed from two axially separate parts, a first part 66 which contains the orifice 54 and a second part 68 which carries the poppet valving means 50 and contains the orifice 58. However, as will be more apparent hereinafter, the pilot piston 48 need not be formed in two separate parts in this embodiment.

A first means of fluid communication 70 connects the push port 28 to the orifice 54, and a second means of fluid communication 72 connects the orifice 58 to the expansion chamber 34. The first means of fluid communication 70 simply comprises a bore 74 in the housing 16 and the annular chamber 62. The second means of fluid communication 72, however, is more complicated. It comprises an axial chamber 76 in the pilot piston housing 20 and a stepped bore 78 in the pilot piston housing 20 leading from the axial chamber 76 upstream of the seat 77 for the poppet valving means 50 to the expansion chamber 34. A one-way flow valve 80 is located in the second means of fluid communication 72 to permit flow from the bore 52 to the expansion chamber 34. Conveniently, the one-way flow valve 80 can be, as illustrated, a ball valve located in the valve seat formed by the step in the stepped bore 78. In this embodiment, a retaining ring 81 around pilot piston housing 20 keeps the ball valve from falling out.

A third means of fluid communication 82 connects the rod chamber 36 to the pull port 30, and a fourth means of fluid communication 84 connects the pull port 30 to the face 56 of the pilot piston 48. The third means of fluid communication 82 comprises a flexible tube 86 connected to an orifice 88 in the housing 16 on the rod side of the farthest travel of the working piston 38 and to an orifice 90 in the housing 16 adjacent the pull port 30 and a stepped bore 92 connecting the orifice 90 to the pull port 30. A restriction 94 is provided in the bore 92 between the orifice 90 and the intersection of the bore 92 and a bore 96 described hereinafter, to limit the speed of the truck cab when the cab goes over center, which induces a load pressure in the rod chamber 36. Conveniently the restriction 94 is located in a plug 98 threaded into the bore 92 at 100. When pressure is applied to the pull port 30, it has to act simultaneously against the face 56 of the pilot piston 48 and against the rod side of the working piston 38. Accordingly, the restrictor 94 is left open to allow pressurized fluid to flow to the rod side of the working piston 38. The fourth means of fluid communication 84 comprises the bore 96, an axial chamber 102, and the portion of the bore 92 between the pull port 30 and the intersection of the bore 92 and the bore 96. The pilot piston 48 is slidably received in the axial chamber 102, which constitutes an extension of the annular chamber 62. The inward face 104 of the pilot piston housing 20 constitutes an abutment limiting rightward movement of at least the first part 66 of the pilot piston 48 and, if the pilot piston 48 is formed integrally, of the entire pilot piston.

Fifth means of fluid communication 106 connect the expansion chamber 34 to a differential pressure chamber 108 defined by an inner surface of the pilot piston housing 20, the outer surface of the pilot piston 48, and the seating side of the poppet valving means 50. The fifth means of fluid communication 106 may, as shown, simply comprise a bore through the pilot piston housing 20.

Finally, means 110 for biasing the poppet valving means 50 towards its seated position are provided. These means may, as shown, comprise a compression spring 112 one end of which is captured in a recess 114 in a plug 116 threaded into the pilot piston housing 20 and the other end of which bears against the pilot piston 48.

Threaded connectors 118 and 120 are received in the push port 28 and the pull port 30, respectively, and tubes 122 and 124 lead from the threaded connectors 118 and 120, respectively, to a four-way control valve, a pump, and a fluid tank, all of which are not shown.

OPERATION OF THE FIRST EMBODIMENT

Using the pump and the four-way control valve, high pressure fluid is directed to the push port 28. It travels through the first means of fluid communication 70, the bores 64, the bore 52, and the second means of fluid communication 72 to the expansion chamber 34, where it extends the rod 40 and lifts the truck cab. Fluid exiting the rod chamber 36 flows through the third means of fluid communication 82 back to the control valve. To pull the cab back to its normal position, the control valve is shifted to direct pressurized fluid to the pull port 30. The pull port pressure acts through the fourth means of fluid communication 84 against the face 56 of the pilot piston 48, thereby pushing the poppet valving means 50 off its seat. This allows flow from the expansion chamber 34 through the fifth means of fluid communication 106 and the differential pressure chamber 108, past the poppet valving means 50 into the axial chamber 76, and through the bores 52 and 64, the first means of fluid communication 70, and the tube 122 back to the control valve.

When the truck cab passes its balance point, an induced pressure starts to develop in the expansion chamber 34. However, the pressurized fluid is trapped in differential pressure chamber 108, and it is not allowed to exhaust to the push port 28 until the induced pressure overcomes the biasing pressure developed by the means 110 or until a combination of the induced pressure and the pilot pressure coming in through the pull port 30 overcomes the biasing pressure. This arrangement has been found in practice to be substantially smoother than pre-existing pilot-operated check valves.

STRUCTURE OF THE SECOND EMBODIMENT

Figure 6:
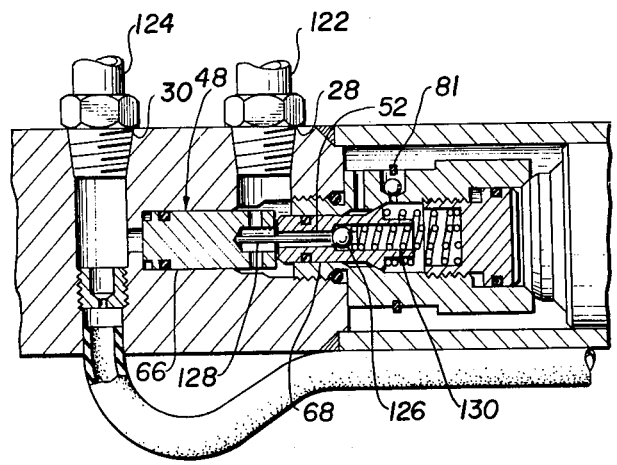
FIG. 6 is a fragmentary cross-sectional view of a second embodiment of this invention showing the two parts of the pilot piston in their spaced position.
Figure 7:
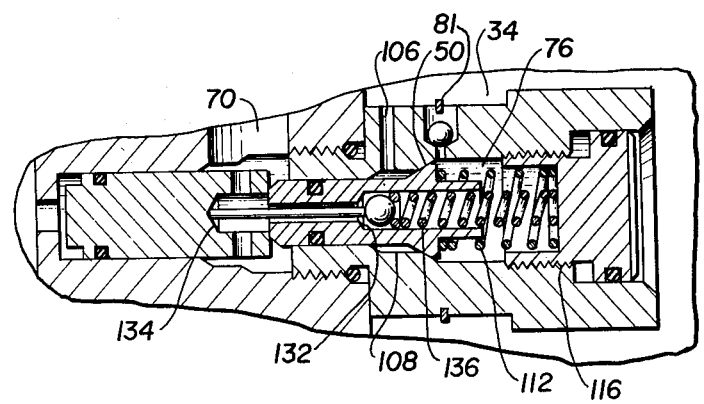
FIG. 7 is a view similar to FIG. 6 except that it shows the two parts of the pilot piston in contact and the ball valve unseated.
Figure 8:
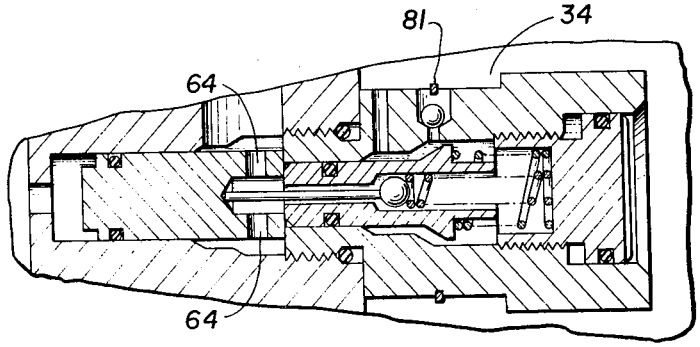
FIG. 8 is a view similar to FIGS. 6 and 7 except that it shows the poppet valve unseated by the rightward motion of the pilot piston.

A second embodiment of the subject invention is shown in FIGS. 6-8. This embodiment is generally very similar to the first embodiment. Accordingly only the differences between the two embodiments will be described here, and parts numbers assigned during the description of the first embodiment will be used where the parts are identical.

In addition to the parts previously described in connection with the first embodiment, the second embodiment comprises a ball valve 126 located in the bore 52, a free-floating pin 128 also located in the bore 52, and means 130 for biasing the ball valve 126 towards its seated position. In this embodiment, the bore 52 is stepped at 132, and the ball valve 126 is seated in the valve seat provided by the step. The free-floating pin 128 is located between the ball valve 126 and an abutment surface 134 in the first part 66 of the pilot piston 48, and it is of a length sufficient to unseat the ball valve 126 when the first part 66 and the second part 68 of the pilot piston 48 are in contact. The means 130 can conveniently comprise a compression spring 136 located coaxially within the compression spring 112 with one end bearing against the plug 116 and the other end bearing against the ball valve 126. As is readily apparent, the means 130 biasing the ball valve 126 towards its seated position also biases the first part 66 and the second part 68 towards a slightly spaced position, as shown in FIG. 6.

OPERATION OF THE SECOND EMBODIMENT

The point of the addition of the ball valve 126, the pin 128, and the means 130 is to assure that no retraction of the rod 40 occurs unless pilot pressure is applied to the pull port 30. When pressure is applied to the pull port 30, the first part 66 of the pilot piston 48 moves to the right, thereby causing the free-floating pin 128 to push the ball valve 126 off its seat against the action of the means 130. See FIG. 7. As the first part 66 moves further to the right, it comes into contact with the second part 68, moving the poppet valving means 50 off its seat as shown in FIG. 8 and allowing flow from the expansion chamber 34 through the fifth means of fluid communication 106 and the differential pressure chamber 108, past the poppet valving means 50 into the axial chamber 76, through the bore 52, around the ball valve 126, and through the bores 64, the first means of fluid communication 70, and the tube 122 back to the control valve.

As will be readily apparent to those skilled in this art, the apparatus described above gives the positive locking of pilot operated check valves plus the smooth load lowering capability of counterbalanced valves.

CAVEAT

While the present invention has been illustrated by detailed descriptions of two preferred embodiments thereof, it will be obvious to those skilled in the art that various changes in form and detail can be made therein without departing from the true scope of the invention. For instance, both cartridges shown could also be placed in the rear of the cylinder to give a full counterbalanced locking system in both directions. Accordingly, the invention must be measured by the claims appended hereto and not by the foregoing preferred embodiment.

What is claimed is:

1. A locking cylinder comprising:
   (a) a housing containing a push port, a pull port, and a first axial chamber;
   (b) a working piston slidably received in said first axial chamber and dividing said first axial chamber into a rod chamber and an expansion chamber;
   (c) a pilot piston housing disposed in said housing and extending into said expansion chamber;
   (d) a pilot piston first part slidably received in a second axial chamber in said housing which terminates against said pilot piston housing, said pilot piston first part containing a first bore communicating with the exterior of said pilot piston first part at a first orifice intermediate its axial faces and at a second orifice in its axial face proximal to said pilot piston housing;
   (e) a pilot piston second part slidably received in a third axial chamber in said pilot piston housing which communicates with said second axial chamber, said pilot piston second part carrying a poppet valving means seatable in a seat in said pilot piston housing and containing a second bore communicating with the exterior of said pilot piston second part at a third orifice in its axial face proximal to said pilot piston first part and at a fourth orifice on the other side of said poppet valving means;
   (f) first means of fluid communication connecting said push port to said first orifice;
   (g) second means of fluid communication connecting said fourth orifice to said expansion chamber;
   (h) a first one-way flow valve in said second means permitting flow from said push port to said expansion chamber;
   (i) third means of fluid communication connecting said rod chamber to said pull port;
   (j) fourth means of fluid communication connecting said pull port to the axial face of said pilot piston first part distal to said pilot piston housing;
   (k) fifth means of fluid communication connecting said expansion chamber to a differential pressure chamber defined by an inner surface of said pilot piston housing, the outer surface of said pilot piston second part, and the seating side of said poppet valving means;
   (l) sixth means for biasing said poppet valving means towards its seated position;
   (m) a second one-way valve located in said second bore;
   (n) a pin located in said first and second bores between said second one-way valve and said pilot piston first part, said pin being of a length sufficient to unseat said second one-way flow valve when said pilot piston first part and said pilot piston second part are in contact; and
   (o) seventh means for biasing said second one-way flow valve towards its seated position, thereby biasing said pilot piston first part and said pilot piston second part towards a slightly spaced position, whereby (p) when high pressure fluid is directed to said push port, it travels through said first means of fluid communication, said first and second bores, and the second means of fluid communication to said expansion chamber, while fluid exiting said rod chamber flows through said third means of fluid communication back to said pull port;
   (q) when high pressure fluid is directed to said pull port, it travels through said third means of fluid communication to said rod chamber and simultaneously through said fourth means of fluid communication to said first axial chamber, where it acts against the axial face of said pilot piston first part distal to said pilot piston housing, causing said pilot piston first part to move towards said pilot piston housing, first causing said pin to unseat said second one-way flow valve and then, as said pilot piston first part moves further towards said pilot piston housing, pushing said poppet valving means off its seat and allowing flow from said expansion chamber through said fifth means of fluid communication, said differential pressure chamber, past said poppet valving means, through said second and first bore, and through said first means of fluid communication back to said push port;
   (r) when an induced pressure develops in said expansion chamber, the pressurized fluid is trapped in said differential pressure chamber, and it is not allowed to exhaust to said push port until the induced pressure overcomes the biasing pressure developed by said sixth means or until a combination of the induced pressure and the pilot pressure coming in through said pull port overcomes the biasing pressure; and
   (s) no retraction of said working piston can occur unless pilot pressure is applied to said pull port, unseating said second one-way flow valve.

2. A locking cylinder as recited in claim 1 wherein said pin is a free-floating pin trapped between said second one-way flow valve and an abutment surface in said pilot piston first part.

3. A locking cylinder as recited in claim 1 wherein said second bore is a stepped bore and said second one-way flow valve is a ball valve located in the valve seat formed by the step in the stepped bore.

4. A locking cylinder as recited in claim 1 wherein said second means of fluid communication comprises:
   (a) a fourth axial chamber in said pilot piston housing and
   (b) an eighth means of fluid communication containing said first one-way flow valve and leading from said fourth axial chamber upstream of the seat for said poppet valving means to said expansion chamber.

5. A locking cylinder as recited in claim 4 wherein said eighth means of fluid communication comprises a stepped bore and said first one-way flow valve is a ball valve located in the valve seat formed by the step in the stepped bore.

6. A locking cylinder as recited in claim 1 wherein said third means of fluid communication comprises:
   (a) a tube connected to a fifth orifice in said housing on the rod side of the farthest travel of said working piston and to a sixth orifice in said housing adjacent said pull port;
   (b) a third bore in said housing connecting said sixth orifice to said pull port; and
   (c) a restriction in said third bore to limit the speed of said working piston when an induced pressure is experienced in said rod chamber.

7. A locking cylinder as recited in claim 6 wherein said third bore is a stepped bore and said restriction is located in a plug threaded into said third bore at the step therein.

8. A locking cylinder as recited in claim 6 wherein said fourth means of fluid communication comprises a fourth bore in said housing leading from said third bore between said restriction and said pull port to said second axial chamber upstream of the axial face of said pilot piston first part distal to said pilot piston housing, the interface of said fourth bore and said second axial chamber constituting an abutment limiting movement of said pilot piston first part.

9. A locking cylinder as recited in claim 1 wherein said third and fourth means of fluid communication comprise a Y the base of which communicates with said pull port, a first branch of which communicates with said rod chamber on the rod side of the farthest travel of said working piston, and a second branch of which communicates with said second axial chamber upstream of the axial face of said pilot piston first part distal to said pilot piston housing.

10. A locking cylinder as recited in claim 9 and further comprising a restriction located in said first branch and serving to limit the speed of said working piston when an induced pressure is experienced in said rod chamber.

11. A locking cylinder as recited in claim 9 wherein the interface of said second branch and said second axial chamber constitute an abutment limiting movement of said pilot piston first part.

12. In a locking cylinder comprising:
(a) a housing containing a push port, a pull port, and a first axial chamber;
(b) a working piston slidably received in said first axial chamber and dividing said first axial chamber into a rod chamber and an expansion chamber;
(c) a pilot piston housing disposed in said housing and extending into said expansion chamber;
(d) a pilot piston slidably received in a second axial chamber in said housing and a third axial chamber in said pilot piston housing, said pilot piston carrying a poppet valving means seatable in a seat in said pilot piston housing and containing a first bore communicating with the exterior of said pilot piston at a first orifice intermediate its axial face distal to said pilot piston housing and said poppet valving means and at a second orifice on the other side of said poppet valving means;
(e) first means of fluid communication connecting said push port to said first orifice;
(f) second means of fluid communication connecting said second orifice to said expansion chamber;
(g) a first ball-type one-way flow valve in said second means permitting flow from said push port to said expansion chamber;
(h) third means of fluid communication connecting said rod chamber to said pull port;
(i) fourth means of fluid communication connecting said pull port to the axial face of said pilot piston distal to said pilot piston housing;
(j) fifth means of fluid communication connecting said expansion chamber to a differential pressure chamber defined by an inner surface of said pilot piston housing, the outer surface of said pilot piston, and the seating side of said poppet valving means; and
(k) sixth means for biasing said poppet valving means towards its seated position, the improvement wherein
(l) said pilot piston is formed in two axially separate parts, a first part which contains said first orifice and a second part which carries said poppet valving means and contains said second orifice and
(m) said locking cylinder further comprises:
(i) a second ball-type one-way flow valve located in the portion of said first bore in said second part of said pilot piston;
(ii) a pin located in said first bore between said second ball-type one-way flow valve and said first part of said pilot piston, said pin being of a length sufficient to unseat said second ball-type one-way flow valve when said first and second parts of said pilot piston are in contact; and
(iii) seventh means for biasing said second ball-type one-way flow valve towards its seated position, thereby biasing said first and second parts of said pilot piston towards a slightly spaced position, whereby no retraction of said working piston can occur unless pilot pressure is applied to said pull port, unseating said second ball-type one-way flow valve.

13. In a locking cylinder as recited in claim 12, the further improvement wherein said pin is a free-floating pin trapped between said second ball-type one-way flow valve and an abutment surface in said first part of said pilot piston.

14. In a locking cylinder as recited in claim 12, the further improvement wherein said first bore is a stepped bore and said second ball-type one-way flow valve is located in the valve seat formed by the step in the stepped bore.

* * * * *